(12) United States Patent
Sampigethaya (10) Patent No.: US 8,767,537 B1
(45) Date of Patent: Jul. 1, 2014

(54) AIRBORNE WIRELESS DEVICE SECURITY

(75) Inventor: Radhakrishna G. Sampigethaya, Snoqualmie, WA (US)

(73) Assignee: The Boeing Company, Chicago, IL (US)

( * ) Notice: Subject to any disclaimer, the term of this patent is extended or adjusted under 35 U.S.C. 154(b) by 227 days.

(21) Appl. No.: 13/049,963

(22) Filed: Mar. 17, 2011

(51) Int. Cl.
| | |
|---|---|
| *G06F 11/00* | (2006.01) |
| *G05B 19/00* | (2006.01) |
| *B60Q 1/00* | (2006.01) |
| *G08B 21/00* | (2006.01) |
| *G01S 5/04* | (2006.01) |
| *H04M 1/66* | (2006.01) |
| *H04L 9/00* | (2006.01) |
| *H04W 12/00* | (2009.01) |
| *G06F 21/00* | (2013.01) |

(52) U.S. Cl.
CPC ............... *H04L 9/00* (2013.01); *H04W 12/00* (2013.01); *G06F 21/00* (2013.01)
USPC ....... 370/230; 340/5.52; 340/425.5; 340/945; 342/445; 455/26.1; 455/410; 455/419; 455/456.5; 726/7

(58) Field of Classification Search
CPC .... G06F 21/00; H04L 29/06612; H04L 43/14
USPC ......... 370/230, 277, 328, 351–430; 455/67.3, 455/418–419, 431, 572; 340/5.2, 5.52, 340/505–539, 945–946, 963, 971; 342/445; 726/7
See application file for complete search history.

(56) References Cited

U.S. PATENT DOCUMENTS

| | | | | |
|---|---|---|---|---|
| 6,448,906 | B1 * | 9/2002 | Nachtsheim et al. | 340/945 |
| 2003/0027550 | A1 * | 2/2003 | Rockwell | 455/410 |
| 2006/0019645 | A1 * | 1/2006 | Azimi et al. | 455/419 |
| 2006/0286930 | A1 * | 12/2006 | Rathus et al. | 455/26.1 |
| 2010/0267375 | A1 * | 10/2010 | Lemmon et al. | 455/418 |
| 2010/0321242 | A1 * | 12/2010 | Robinson et al. | 342/445 |
| 2011/0241827 | A1 * | 10/2011 | Varoglu | 340/5.52 |

OTHER PUBLICATIONS

"Wireless Cyber Assets Discovery Visualization." Proceedings of the Workshop on Visualization for Computer Security (VizSec), Springer LNCS, 2008, 136-143., Kenneth Prole, John R. Goodall, Anita D. D'Amico, and Jason Kopylec.*
MeerCAT Pro 3.2—User Manual, Applied Visions, Inc (AVI), Secure Decisions Division, 6 Bayview Avenue, Northport, NY 11768, www.SecureDecisions.AVI.com, (631) 754-4920.*
Aura et al., "Chattering Laptops", Proc. of 8th Privacy Enhancing Technologies Symposium, Leuven, Belgium, Jul. 2008, pp. 1-21.
Sampigethaya et al., "Security of Future eEnabled Aircraft Ad hoc Networks", American Institute of Aeronautics and Astronautics, 2006, IEEE, pp. 1-10.

(Continued)

*Primary Examiner* — Jung Park
*Assistant Examiner* — Chuong M Nguyen
(74) *Attorney, Agent, or Firm* — Yee & Associates, P.C.

(57) ABSTRACT

A method and apparatus for managing wireless devices on an aircraft. A map for a number of wireless devices on the aircraft is generated. The number of wireless devices is identified in a profile. A risk for the number of wireless devices on the aircraft is identified during operation of the aircraft using state information for the aircraft and the profile. Access to a wireless network on the aircraft by the number of wireless devices is managed based on the risk identified for the number of wireless devices.

20 Claims, 7 Drawing Sheets

(56) References Cited

OTHER PUBLICATIONS

Marks, "Aircraft bomb finds may spell end for in-flight Wi-Fi," NewScientist Tech, Reed Business Information Ltd., Nov. 2010, 4 pages.

Woods et al., "Detecting the use of Intentionally Transmitting Personal Electronic Devices Onboard Commercial Aircraft," IEEE International Symposium on Electromagnetic Compatibility, vol. 1, Aug. 2003, pp. 263-268.

"Guidance on Allowing Transmitting Portable Electronic Devices (T-PEDs) on Aircraft," Document No. DO-294C, RTCA, Inc. Committee SC-202, Dec. 2008, 1 page.

Smith et al., "Airlines may be forced to fit anti-terror cameras in seats," The Sunday Times (UK), Jun. 2008, 2 pages.

\* cited by examiner

AIRBORNE WIRELESS DEVICE SECURITY

BACKGROUND INFORMATION

1. Field

The present disclosure relates generally to aircraft and, in particular, to security on aircraft. Still more particularly, the present disclosure relates to a method and apparatus for managing security of wireless devices on an aircraft.

2. Background

In-flight passenger Internet connectivity is becoming increasingly available on aircraft for passengers. Many passengers now have one or more personal electronic devices (PEDs) that are carried on board during flight. For example, a passenger may have a laptop, a mobile phone, and/or other devices that are capable of Internet access using wireless connections. With these services, a passenger during an en route flight phase may use a laptop or mobile phone to access the Internet. This access is provided by access points located in the aircraft. These access points are connected to satellite, airborne, or land-based networks to various service providers.

With this increased use, some concerns are present with respect to interference with aircraft systems that may be caused through the use of these personal electronic devices. Additionally, concerns are also present with respect to unauthorized or undesired uses of these devices on the aircraft.

For example, some concerns are present with respect to hackers or other persons gathering unauthorized access to systems or devices on the aircraft.

Therefore, it would be advantageous to have a method and apparatus that takes into account at least some of the issues discussed above, as well as possibly other issues.

SUMMARY

In one advantageous embodiment, a method for managing wireless devices on an aircraft is provided. A map for a number of wireless devices on the aircraft is generated. The number of wireless devices is identified in a profile. A risk for the number of wireless devices on the aircraft is identified during operation of the aircraft using state information for the aircraft and the profile. Access to a wireless network on the aircraft by the number of wireless devices is managed based on the risk identified for the number of wireless devices.

In another advantageous embodiment, a method for managing communications by wireless devices is provided. A profile for a number of wireless devices is built on a platform. A map of the number of wireless devices on the platform is generated. A risk for the number of wireless devices on the platform is identified using state information for the platform and the profile.

In yet another advantageous embodiment, an apparatus comprises a wireless device management system. The wireless device management system is configured to generate a map for a number of wireless devices on an aircraft in which the number of wireless devices is identified in a profile. The wireless device management system is configured to identify a risk for the number of wireless devices on the aircraft during operation of the aircraft using state information for the aircraft and the profile. The wireless device management system is configured to manage access to a wireless network on the aircraft by the number of wireless devices based on the risk identified for the number of wireless devices.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
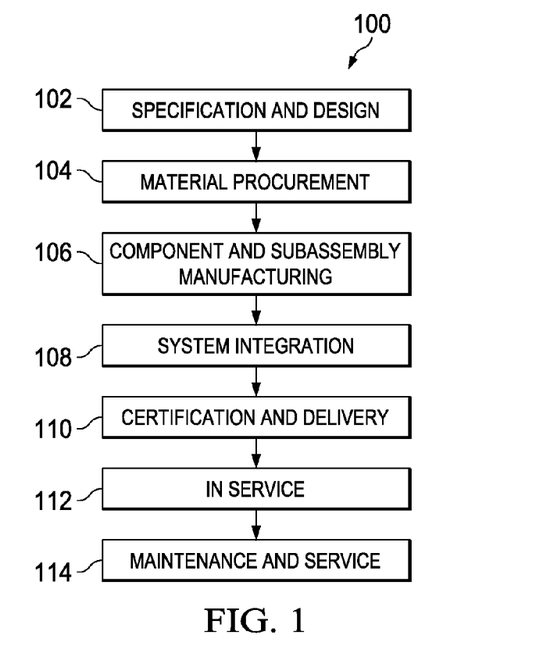
FIG. 1 is an illustration of an aircraft manufacturing and service method in accordance with an advantageous embodiment.
Figure 2:
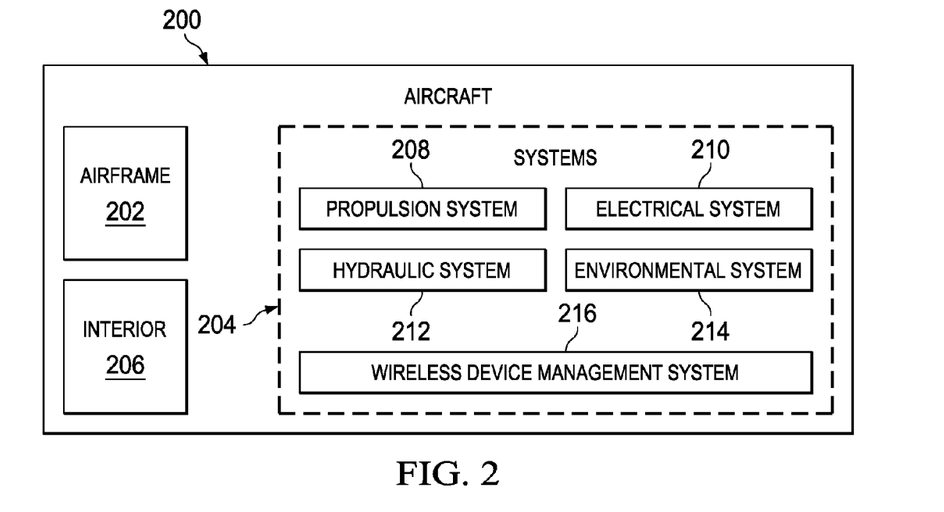
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with plurality of systems 204 and interior 206. Examples of systems 204 include one or more of propulsion system 208, electrical system 210, hydraulic system 212, environmental system 214, and wireless device management system 216. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies for wireless device management system 216 produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. For example, wireless device management system 216 may be used to monitor components in aircraft 200 while in service 112 or for performing inspections during maintenance and service 114. The use of a number of the different advantageous embodiments may substantially expedite the assembly of and/or reduce the cost of aircraft 200.

The different advantageous embodiments recognize and take into account a number of different considerations. For example, the different advantageous embodiments recognize and take into account that one concern with respect to the use of personal electronic devices is unauthorized attempts to access different systems on the aircraft or on the ground using the wireless network on the aircraft.

As another example, the different advantageous embodiments recognize and take into account that with wireless communications, unauthorized users on the aircraft may attempt to manipulate data using the wireless access provided within the aircraft. For example, a malicious passenger may attempt to corrupt data that is distributed by the aircraft to the ground for use by air traffic controllers, dispatchers, and maintenance personnel.

Additionally, the different advantageous embodiments recognize and take into account that with the presence of wireless access on an aircraft, this type of capability may provide a remote user a connection to access and/or control devices that may be placed in the passenger cabin, cargo, bulk holds, or other locations in the aircraft. These types of access may include, for example, undetected networked physical weapons. The different advantageous embodiments recognize and take into account that a need is present to detect and prevent these and other threats in an aircraft.

Thus, the different advantageous embodiments provide a method and apparatus for managing wireless devices on an aircraft. A map is generated for a number of wireless devices on the aircraft in which the number of wireless devices is identified in a profile. A risk is identified for the number of wireless devices on the aircraft during operation of the aircraft using state information for the aircraft and the profile. Access to a wireless network on the aircraft by the number of wireless devices is managed based on the risk identified for the number of wireless devices.

Figure 3:
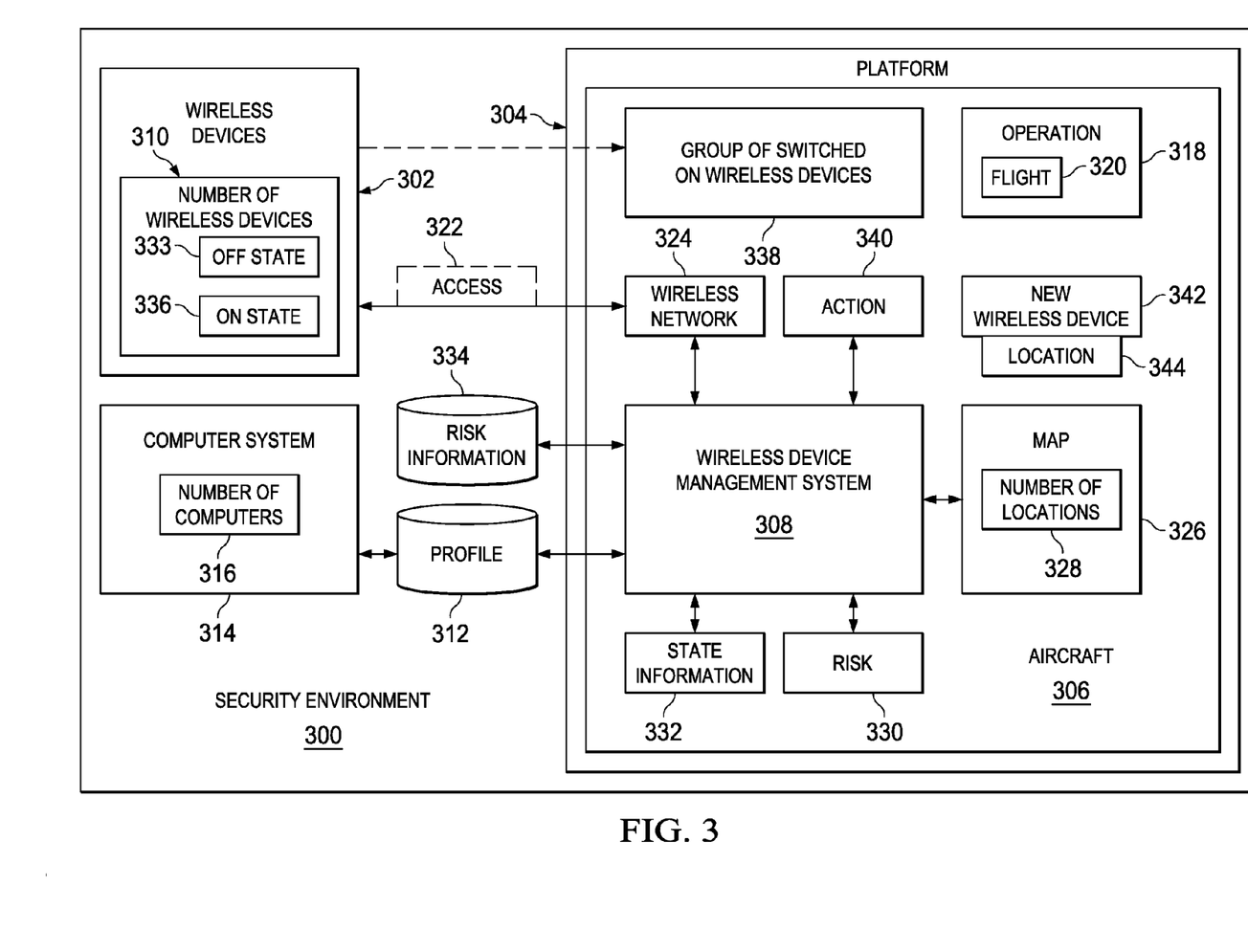
FIG. 3 is an illustration of a security environment in accordance with an advantageous embodiment.

With reference now to FIG. 3, an illustration of a security environment is depicted in accordance with an advantageous embodiment. In this illustrative example, security environment 300 provides for the management of wireless devices 302. In particular, security environment 300 provides for the management of wireless devices 302 used with respect to platform 304. In these illustrative examples, platform 304 takes the form of aircraft 306. Aircraft 306 may be implemented using aircraft 200 in FIG. 2.

In these illustrative examples, wireless device management system 308 is used to manage number of wireless devices 310 that may be used on aircraft 306. Wireless device management system 308 may take the form of hardware, software, or a combination of the two. In these different illustrative examples, a portion or all of wireless device management system 308 may be associated with aircraft 306. Wireless device management system 308 is an example of wireless device management system 216 in FIG. 2.

A first component, such as wireless device management system 308, may be considered to be associated with a second component by being secured to the second component, bonded to the second component, fastened to the second component, electrically connected to the second component, and/or connected to the second component in some other suitable manner. The first component also may be connected to the second component using a third component. The first component may also be considered to be associated with the second component by being formed as part of and/or an extension of the second component.

In these illustrative examples, profile 312 is generated for number of wireless devices 310. Profile 312 contains information about number of wireless devices 310. In these illustrative examples, profile 312 may be generated by wireless device management system 308 or by another system, such as computer system 314. Computer system 314 contains number of computers 316.

Computer system 314 may be located at a number of different locations other than in aircraft 306. For example, part or all of computer system 314 may be located at the airport, an airline, a security service, and/or some other suitable location. In other illustrative examples, one or more of number of computers 316 may be located in aircraft 306.

In these illustrative examples, profile 312 is generated prior to number of wireless devices 310 being carried or moved onto aircraft 306. Further, profile 312 may be generated prior to operation 318 of aircraft 306. In other words, profile 312 may be generated prior to flight 320 of aircraft 306 with number of wireless devices 310 on board aircraft 306.

After number of wireless devices 310 have been carried or moved onto aircraft 306, wireless device management system 308 manages access 322 to wireless network 324 by number of wireless devices 310. For example, wireless device management system 308 manages access 322 of number of wireless devices 310 to wireless network 324 during flight 320 of aircraft 306.

In particular, wireless device management system 308 generates map 326 for number of wireless devices 310. Map 326 provides number of locations 328 for number of wireless devices 310 on aircraft 306. These locations may be, for example, seat locations, cargo hold identifiers, coordinates, and/or other suitable identifications for number of locations 328 for number of wireless devices 310 on aircraft 306.

For example, map 326 may be generated using at least one of a passenger seat assignment, a cargo placement, a detection of a device in an on state on the aircraft, and/or other suitable information. This information may be used to provide number of locations 328 for number of wireless devices 310 on aircraft 306.

Wireless device management system 308 identifies risk 330 for number of wireless devices 310 on aircraft 306 during operation 318 of aircraft 306. In the depicted example, risk 330 is identified using state information 332 for aircraft 306 and profile 312. In still other illustrative examples, risk 330 may be identified using risk information 334. Risk information 334 may be correlated to or used with information about number of wireless devices 310 in profile 312 to identify risk 330.

Risk 330 may be identified for each wireless device in number of wireless devices 310. In some illustrative examples, risk 330 may be identified for only a portion of number of wireless devices 310. For example, wireless devices 302 for crew members may not be identified in some cases. Based on risk 330, wireless device management system 308 is configured to manage access 322 to wireless network 324 by number of wireless devices 310.

Each wireless device in number of wireless devices 310 may be in either off state 333 or on state 336. In these illustrative examples, a wireless device in number of wireless devices 310 is considered to be in on state 336 when the wireless device is turned on and transmits a wireless signal. A wireless device is considered to be in off state 333 when the device does not transmit a wireless signal. A device may be considered to be in off state 333 when powered on, but not transmitting signals.

In one illustrative example, each wireless device in number of wireless devices 310 that is in on state 336 is identified to form group of switched on wireless devices 338. Group of switched on wireless devices 338 includes the wireless devices in number of wireless devices 310 that are in on state 336 on aircraft 306.

Wireless device management system 308, in this example, identifies risk 330 for each wireless device in group of switched on wireless devices 338. Wireless device management system 308 manages access 322 for each wireless device in group of switched on wireless devices 338 based on risk 330 identified for these wireless devices that are switched on.

Further, action 340 may be initiated based on risk 330 identified for number of wireless devices 310, group of switched on wireless devices 338, or a combination of the two. This action may take a number of different forms.

For example, without limitation, a crew member may request or perform certain actions with respect to one or more of the wireless devices identified as needing action 340. In still other illustrative examples, a transmitter in aircraft 306 may send out radio waves along the same frequencies as each wireless device for which action 340 has been identified based on risk 330 in a manner that causes interference that renders those wireless devices unable to access wireless network 324 or any other wireless network that may be in range of aircraft 306.

In these illustrative examples, action 340 may be selected as one of taking no action, preventing communications by group of switched on wireless devices 338, preventing a selected type of communications by group of switched on wireless devices 338, preventing communications of a particular switched on device in group of switched on wireless devices 338 based on a location of the particular switched on device on aircraft 306, and/or some other suitable type of action.

Additionally, wireless device management system 308 monitors for a presence of new wireless device 342 during operation 318 of aircraft 306. When new wireless device 342 is detected, wireless device management system 308 updates map 326 to include new wireless device 342. For example, wireless device management system 308 may identify location 344 for new wireless device 342 in aircraft 306. Wireless device management system 308 may then add new wireless device 342 to map 326 based on location 344 in aircraft 306.

Further, wireless device management system 308 may update map 326 during operation 318 of aircraft 306 to reflect changes in number of locations 328 of the number of wireless devices 310 on aircraft 306.

With the use of wireless device management system 308, undesired actions or access 322 to wireless network 324 may be prevented. Further, wireless device management system 308 also may limit the type of access 322 number of wireless devices 310 may have to wireless network 324 and/or the total number of wireless devices 310 that may have access 322 to wireless network 324 at any given point in time during flight 320. For example, some wireless devices in number of wireless devices 310 may be denied access 322 to wireless network 324, while other wireless devices within number of wireless devices 310 are allowed access 322.

The illustration of security environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, portions of wireless device management system 308 may be located remotely to aircraft 306. For example, wireless device management system 308 may be in a remote location, such as on computer system 314, and accessed by aircraft 306 through a wireless communications link using wireless network 324.

In still other illustrative examples, security environment 300 may be implemented using platform 304 that takes a form other than aircraft 306. For example, without limitation, other advantageous embodiments may be applied to a mobile platform, a stationary platform, a land-based structure, an aquatic-based structure, a space-based structure and/or some other suitable object.

More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable object.

Figure 4:
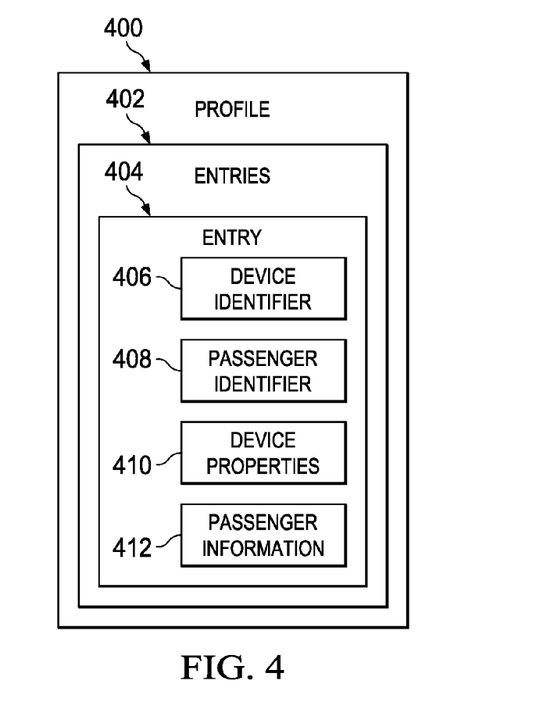
FIG. 4 is an illustration of a profile in accordance with an advantageous embodiment.

With reference now to FIG. 4, an illustration of a profile is depicted in accordance with an advantageous embodiment. Profile 400 is an example of one implementation of profile 312 in FIG. 3. In this illustrative example, profile 400 is used to identify a risk for a particular wireless device based on the state of the aircraft and other information.

In this illustrative example, profile 400 includes entries 402 in which each entry in entries 402 corresponds to a particular wireless device. For example, entry 404 is an example of an entry corresponding to a wireless device, such as a wireless device in number of wireless devices 310 in FIG. 3. In this depicted example, entry 404 includes device identifier 406, passenger identifier 408, device properties 410, and passenger information 412.

Device identifier 406 is an identifier that uniquely identifies a wireless device. Device identifier 406 may be any sort of identifier for the wireless device. For example, without limitation, device identifier 406 may be a media access control (MAC) address. A media access control address is typically a unique identifier assigned to a network adapter or network interface card. Of course, other types of identifiers may be used. These identifiers may include serial numbers and other suitable types of identifiers.

Passenger identifier 408 in entry 404 identifies a passenger that carries or uses the particular wireless device. This passenger identifier includes the name of the passenger. Further, passenger identifier 408 may include other information. For example, passenger identifier 408 also may include at least one of height, weight, a photo of the passenger, and other suitable types of identifiers that may be used to identify the passenger for which the wireless device is associated.

As used herein, the phrase "at least one of", when used with a list of items, means that different combinations of one or more of the listed items may be used and only one of each item in the list may be needed.

For example, "at least one of item A, item B, and item C" may include, for example, without limitation, item A or item A and item B. This example also may include item A, item B, and item C, or item B and item C.

Device properties 410 include any properties about the wireless device that may be used to identify the wireless device. Further, device properties 410 provide information that may be used to identify a risk of the wireless device.

In this illustrative example, device properties 410 may include, for example, without limitation, a radio frequency signature for the wireless device. The radio frequency signature may include, for example, at least one of an identification of the characteristics of the manner in which radio frequency signals are transmitted by the wireless device, the frequency at which signals are transmitted, the duration at which signals are transmitted when the device is in an idle state, the strength of the radio frequency signal, and other suitable types of information that may be used to identify a particular type of wireless device.

Device properties 410 also may include other information in addition to what is illustrated in entry 404. For example, without limitation, this other information may include a type of processor in the wireless device; an amount of storage in the wireless device; display capabilities of the wireless device; dimensions of the wireless device; hardware characteristics, such as temperature and clock skew; data link information, such as media access control (MAC) layer capabilities and configuration; upper network layer attributes, such as domain name system (DNS) names connected to by the wireless device; and/or other suitable types of information about the wireless device.

Passenger information 412 includes information used to identify potential risks for the wireless device. Passenger information 412 may include, for example, without limitation, at least one of an address of the passenger, a phone number, a social security number, a seat assignment for the passenger, a flight identifier, and other suitable information for the passenger. This information may be compared to risk information 334 in FIG. 3 to identify risk 330 for the particular wireless device.

The illustration of entry 404 for profile 400 is not meant to imply limitations to the manner in which different profiles may be implemented. Other profiles may include other information in addition to and/or in place of the information illustrated in this example. For example, a risk value may be generated for a combination of device properties 410 and passenger information 412. This risk value may be used in identifying a risk for the wireless device on the aircraft.

Figure 5:
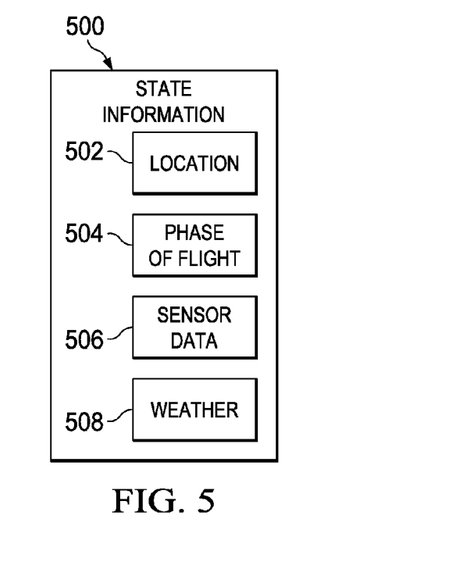
FIG. 5 is an illustration of state information in accordance with an advantageous embodiment.

With reference now to FIG. 5, an illustration of state information is depicted in accordance with an advantageous embodiment. State information 500 is an example of one implementation of state information 332 in FIG. 3.

In this illustrative example, state information 500 is state information for aircraft 306 in FIG. 3. As depicted, state information 500 includes location 502, phase of flight 504, sensor data 506, and weather 508.

Location 502 is a location of the aircraft. This location may be in three dimensions including latitude, longitude, and altitude. Phase of flight 504 indicates the phase of flight for the aircraft. Phase of flight 504 may include, for example, at least one of at gate, taxiing, landing, takeoff, en route, climbing, descending, and other suitable types of phase of flight for the aircraft.

In this illustrative example, sensor data 506 includes information generated by sensors in the aircraft. Sensor data 506 may include, for example, without limitation, at least one of airspeed, altitude, temperature, pressure, attitude, engine temperature, cabin temperature, fuel remaining, fuel usage, video from a passenger cabin surveillance system, and other suitable types of sensor data.

Weather 508 identifies weather around the aircraft during flight. Of course, other information may be used in addition to and/or in place of the information illustrated in this example. For example, state information 500 also may include other types of information in addition to or in place of the examples described for location 502, phase of flight 504, sensor data 506, and weather 508. For example, state information 500 also may include airspace occupied by the aircraft, other aircraft occupying the shared airspace, present time of day or night, present radio environment experienced by the aircraft, and other types of information.

Figure 6:
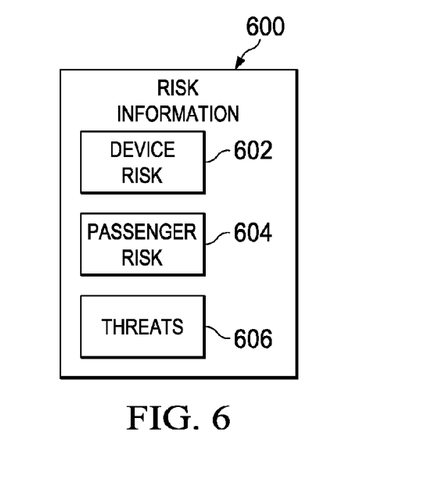
FIG. 6 is an illustration of risk information in accordance with an advantageous embodiment.

With reference now to FIG. 6, an illustration of risk information is depicted in accordance with an advantageous embodiment. In this illustrative example, risk information 600 is an example of risk information 334 in FIG. 3. Risk information 600 is any information that can be used to identify risk 330 for number of wireless devices 310 on a platform, such as aircraft 306 in FIG. 3.

In these illustrative examples, risk information 600 may include device risk 602, passenger risk 604, and threats 606. Device risk 602 may identify a risk based on a particular type of wireless device. This risk may include an identification of interference caused by the wireless device, use of the wireless device for undesired activities, and/or other suitable information.

Passenger risk 604 may identify passengers who, based on intelligence gathered or other information, may pose a potential risk for a particular flight. Threats 606 may include information about threats that may be present to various locations, cargo types, sources of cargo, types of transportation, particular airlines, and/or other types of information. For example, the locations may be particular starting locations and/or destinations for flights. Cargo types may be, for example, overnight packages, unit load devices, liquids, gas canisters, and other types of cargo that may be identified as having a threat. The types of transportation may include, for example, threats to aircraft of a particular size or model.

Figure 7:
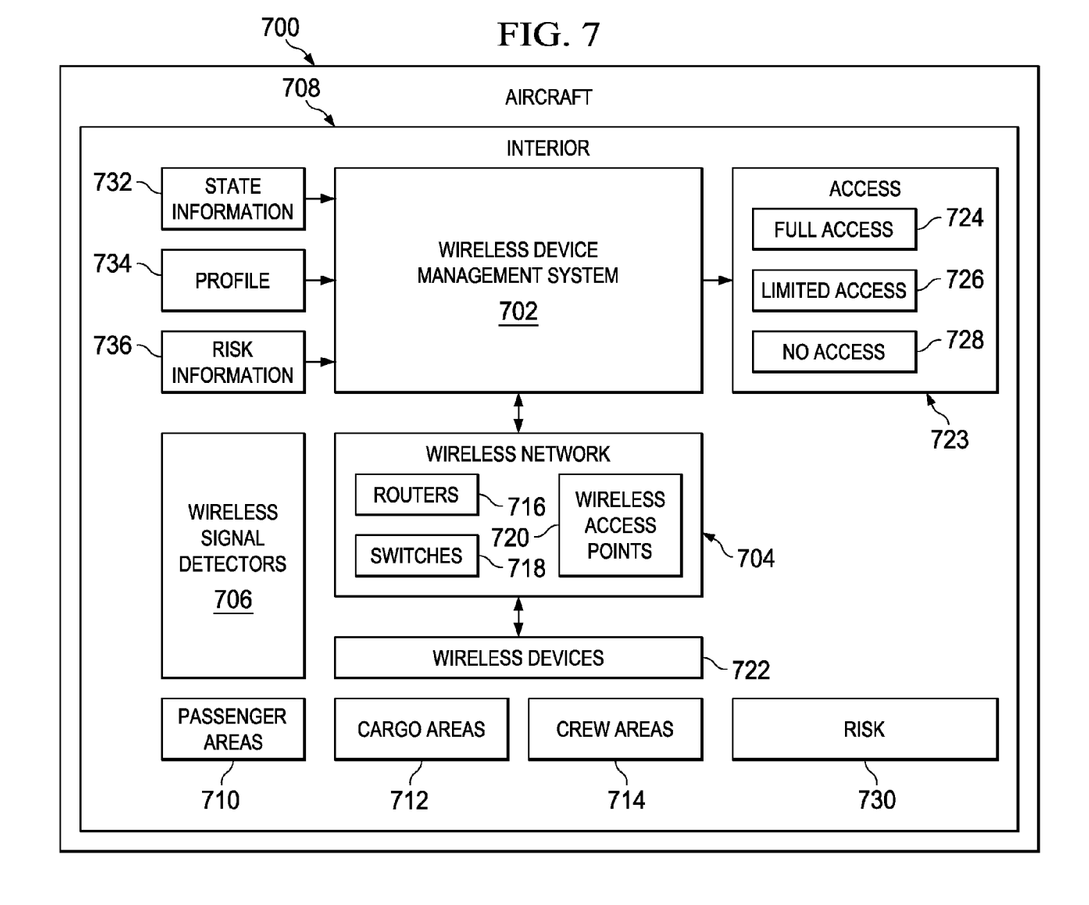
FIG. 7 is an illustration of a security environment in an aircraft in accordance with an advantageous embodiment.

With reference now to FIG. 7, an illustration of a security environment in an aircraft is depicted in accordance with an advantageous embodiment. In this illustrative example, aircraft 700 is an example of one implementation for aircraft 306 in FIG. 3 and aircraft 200 in FIG. 2.

In this illustrative example, aircraft 700 includes wireless device management system 702, wireless network 704, and wireless signal detectors 706. These different components may be located in different locations within interior 708 of aircraft 700. Interior 708 includes passenger areas 710, cargo areas 712, and crew areas 714.

Wireless device management system 702 may be implemented in hardware, software, or a combination of the two within interior 708 of aircraft 700. In these illustrative examples, wireless network 704 includes routers 716, switches 718, and wireless access point 720. Wireless network 704 may extend through passenger areas 710, cargo areas 712, and crew areas 714. Wireless network 704 provides wireless devices 722 with access 723 to the Internet in these depicted examples.

Routers 716 direct and control traffic from wireless devices 722 that may be located within interior 708 of aircraft 700. Routers 716 may be configured by wireless device management system 702 to provide different types of access 723 to wireless devices 722.

Access 723 may include, for example, full access 724, limited access 726, or no access 728. In this illustrative example, full access 724 provides a wireless device full access to the Internet without restriction. Limited access 726 may limit the types of access that may occur. For example, limited access 726 may prevent the transfer of files and/or the sending and/or receiving of email messages, voice messages, images, or other types of information. Limited access 726 also may limit the websites or remote devices that may be accessed through wireless network 704.

No access 728 provides no access to the wireless network by the wireless device. Wireless device management system 702 may control the type of access 723 for a wireless device in wireless devices 722 independently of the other wireless devices in wireless devices 722.

The type of access 723 provided may be based on risk 730 identified for wireless devices 722. Risk 730 may be identified for each device in wireless devices 722, wireless devices 722 as a group, or a combination of the two. In these illustrative examples, risk 730 may be identified based on state information 732, profile 734, and risk information 736.

State information 732 is state information for aircraft 700 and may include state information, such as state information 500 in FIG. 5. Profile 734 may be implemented using profile 400 in FIG. 4 in these examples. Risk information 736 may be risk information that is identified for each type of device, passenger, or other types of risk information. For example, risk information 736 may include risk information 600 in FIG. 6.

Additionally, wireless device management system 702 may identify and initiate other actions in addition to managing access 723 of wireless devices 722 to wireless network 704. For example, wireless device management system 702 may generate an alert to at least one of a pilot, an air traffic controller, a dispatcher, airline personnel, or some other person based on risk 730.

Additionally, the action may include providing instructions to flight deck crew, cabin crew, and/or other authorized persons to perform manual or visual inspection and confirm existence of the risk, coordinate a response with security personnel on the aircraft and/or the ground, switch off all wireless network access on the aircraft, change the flight plan, or other types of actions.

Wireless signal detectors 706 are configured to detect wireless signals that may be generated by wireless devices 722. In this manner, when wireless devices 722 are in an on state, those devices can be detected. Further, if additional wireless devices not known in profile 734 are identified, those wireless devices may be added to profile 734, and risk 730 may be identified for those new wireless devices.

The illustration of aircraft 700 with wireless device management system 702 and wireless network 704 is presented as an example of one implementation for security environment 300 in FIG. 3. This example is not meant to implement the manner in which other security environments may be implemented. For example, in some wireless networks, only a single router may be present, or no switches may be present.

In some illustrative examples, some of wireless signal detectors 706 may be in locations other than in aircraft 700. For example, wireless signal detectors 706 may be at a security checkpoint in an airport, at a gate in the airport, and/or in some other suitable location. In this manner, wireless devices 722 may be identified prior to wireless devices 722 being carried onboard aircraft 700. For example, wireless devices 722 may be identified when passengers are waiting to board aircraft 700 at a gate in an airport.

Further, a number of computers for generating profile 734 may be present remotely to aircraft 700 and/or onboard aircraft 700. In this manner, profile 734 for each wireless device in wireless devices 722 may be generated prior to wireless devices 722 being carried onboard aircraft 700, after wireless devices 722 have been carried onboard aircraft 700, and/or during the various phases of flight of aircraft 700. In this manner, profile 734 may be generated for new wireless devices that may be identified during flight.

Figure 8:
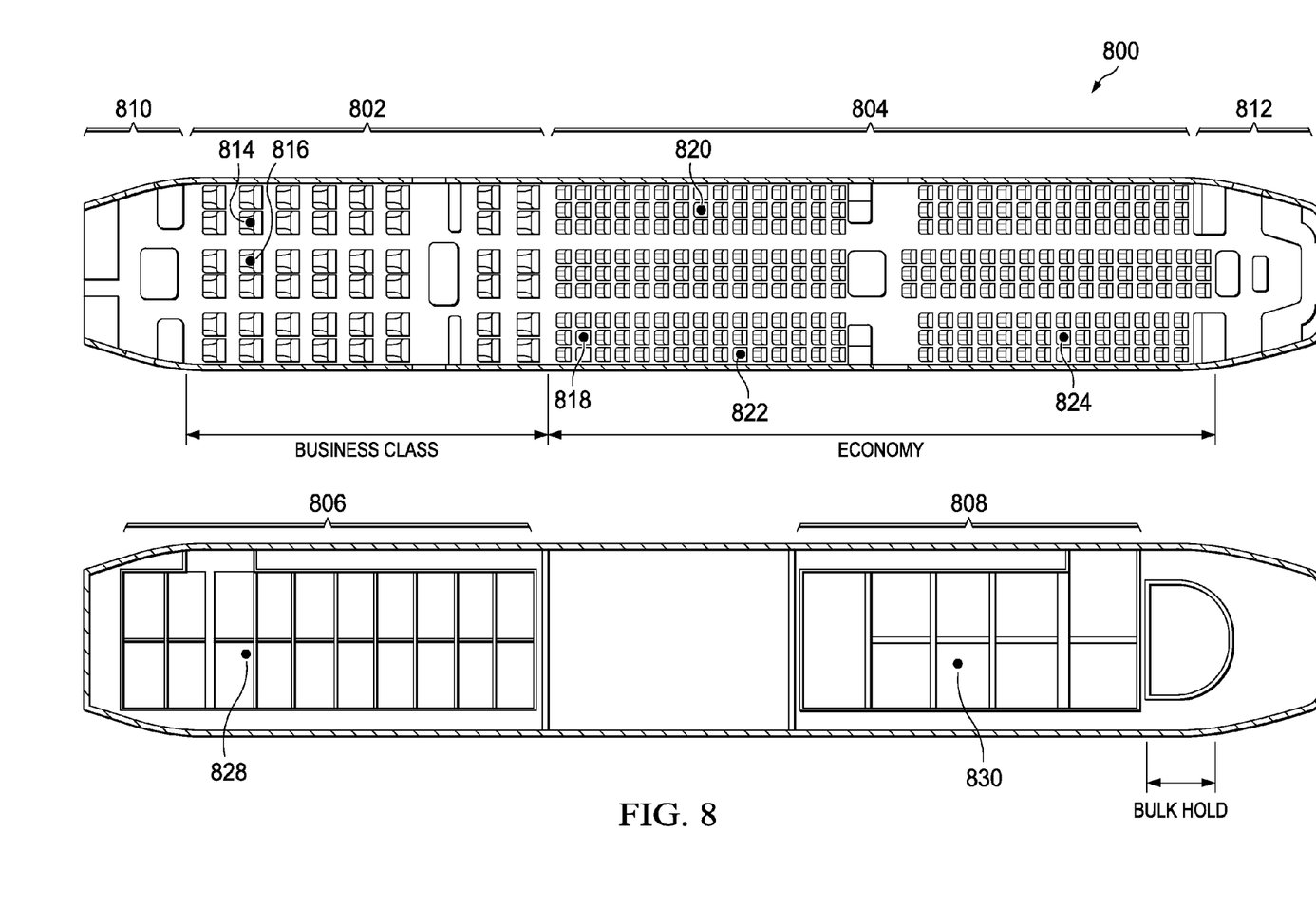
FIG. 8 is an illustration of a map of wireless devices in accordance with an advantageous embodiment.

With reference now to FIG. 8, an illustration of a map of wireless devices is depicted in accordance with an advantageous embodiment. In this illustrative example, map 800 is an example of map 326 that may be generated by wireless device management system 308 in FIG. 3 or computer system 314 in FIG. 3.

As illustrated, map 800 is a map of different decks on an aircraft. In this illustrative example, map 800 includes passenger area 802, passenger area 804, cargo area 806, cargo area 808, crew area 810, and crew area 812. Graphical indicators 814, 816, 818, 820, 822, and 824 are shown in passenger areas 802 and 804. Graphical indicator 828 is located in cargo area 806. Graphical indicator 830 is shown in cargo area 808.

These graphical indicators may be linked to or pointing to information in a profile for each of the wireless devices. Map 800 may be updated as wireless devices move within the aircraft. Further, when a new wireless device is detected, this wireless device also may be displayed on map 800. Further, an identification of switched on devices and devices that are not switched on also may be identified through the graphical indicators. These different identifications may be made using various techniques, such as color, animation, text, and other suitable types of techniques.

The illustration of map 800 is not meant to limit the manner in which other maps may be presented or organized. For example, in other illustrative examples, passenger areas may be present on multiple decks. Further, only a few graphical indicators were presented in this example to illustrate the manner in which a map may be displayed. In actual use, many more wireless devices may be present, as well as graphical indicators for those wireless devices.

Figure 9:
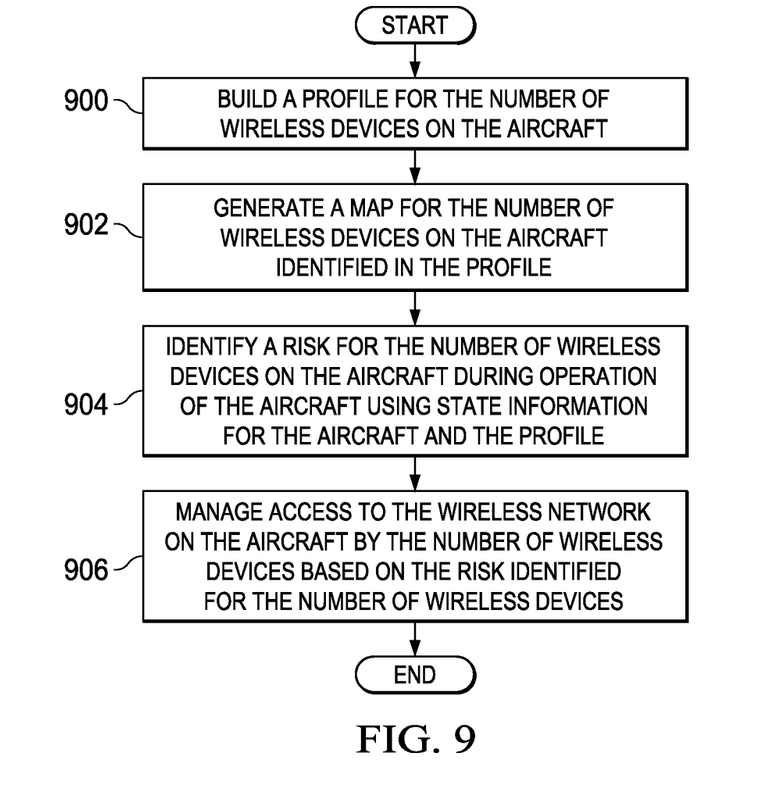
FIG. 9 is an illustration of a flowchart of a process for managing wireless devices on a platform in accordance with an advantageous embodiment.

With reference now to FIG. 9, an illustration of a flowchart of a process for managing wireless devices on a platform is depicted in accordance with an advantageous embodiment. The process illustrated in FIG. 9 may be implemented in a platform, such as platform 304 in FIG. 3. In particular, the platform may take the form of an aircraft, such as aircraft 306 in FIG. 3.

The process begins by building a profile for the number of wireless devices on the aircraft (operation 900). Thereafter, a map is generated for the number of wireless devices on the aircraft identified in the profile (operation 902). The process then identifies a risk for the number of wireless devices on the aircraft during operation of the aircraft using state information for the aircraft and the profile (operation 904). This operation also may include using risk information that has been identified.

Thereafter, the process manages access to the wireless network on the aircraft by the number of wireless devices based on the risk identified for the number of wireless devices (operation 906), with the process terminating thereafter.

Figure 10:
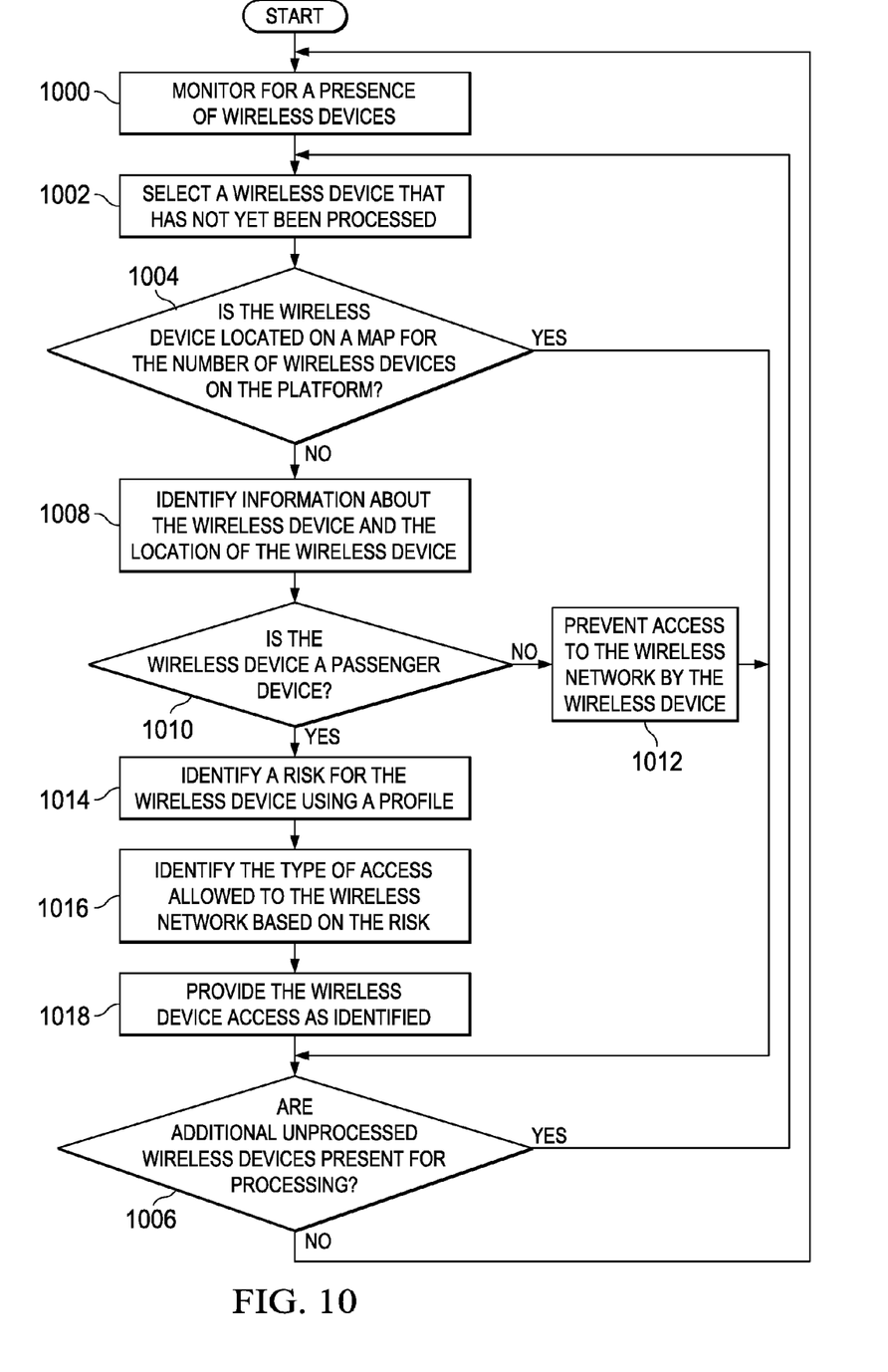
FIG. 10 is an illustration of a flowchart of a process for managing access to a wireless network for a platform in accordance with an advantageous embodiment.

With reference now to FIG. 10, an illustration of a flowchart of a process for managing access to a wireless network for a platform is depicted in accordance with an advantageous embodiment. The process illustrated in FIG. 10 is an example of one implementation for operation 906 in FIG. 9.

The process begins by monitoring for a presence of wireless devices (operation 1000). The process then selects a wireless device that has not yet been processed (operation 1002). A determination is made as to whether the wireless device is located on a map generated for the number of wireless devices on the platform (operation 1004). If the device is on the map, the process then determines whether additional unprocessed wireless devices are present for processing (operation 1006). If additional wireless devices are present for processing, the process returns to operation 1002. Otherwise, the process returns to operation 1000.

With reference again to operation 1004, if the wireless device is not located on the map, the process then identifies information about the wireless device and the location of the wireless device (operation 1008). A determination is then made as to whether the wireless device is a passenger device (operation 1010).

This determination may be made based on the location of the wireless device in these illustrative examples. Of course, other techniques may be used to determine whether a wireless device is a passenger device. For example, information about the wireless device may be used to determine whether the device is one that would be used by a passenger if the wireless device is located in a passenger area.

If the wireless device is not a passenger device, the process prevents access to the wireless network by the wireless device (operation 1012). The process then proceeds to operation 1006 as described above.

With reference again to operation 1010, if the wireless device is a passenger device, the process then identifies a risk for the wireless device using a profile (operation 1014). The process then identifies the type of access allowed to the wireless network based on the risk (operation 1016). The process then provides the wireless device access as identified (operation 1018). The process then returns to operation 1006 as described above.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for managing wireless devices on an aircraft. A map is generated for a number of wireless devices on the aircraft in which the number of wireless devices is identified in a profile. A risk is identified for the number of wireless devices on the aircraft during operation of the aircraft using state information for the aircraft and the profile. Access to a wireless network on the aircraft by the number of wireless devices is managed based on the risk identified for the number of wireless devices.

In this manner, the different advantageous embodiments provide a system configured to prevent unauthorized access to a wireless network for an aircraft. Further, with one or more of the advantageous embodiments, access by a wireless device to networks on the aircraft, networks in range of the aircraft, or both may be prevented if the wireless device is determined to pose a threat. Some or all of the advantageous embodiments may prevent a wireless device in the aircraft from being accessed by other wireless devices in the aircraft using the wireless network on the aircraft. Also, access by other devices that attempt to access the wireless device though the wireless network on the aircraft and the connection of the wireless network to the Internet may be prevented if the wireless device is determined to pose a threat.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing wireless devices on an aircraft, the method comprising:
    generating a map for a number of wireless devices on the aircraft in which the number of wireless devices is identified in a profile;
        wherein the map comprises graphical indicators on a representation of an interior of the aircraft indicating locations of the number of wireless devices on the aircraft;
        wherein the profile comprises a number of entries;

wherein each entry in the number of entries comprises device properties for a wireless device in the number of wireless devices on the aircraft and a passenger identifier;

and wherein the map and the profile are generated by a wireless device management system comprising one or more of hardware and non-transitory software;

identifying, by the wireless device management system, a risk of a threat that the wireless device in the number of wireless devices on the aircraft accesses a networked physical weapon on the aircraft during operation of the aircraft using state information for the aircraft and the profile; and managing, by the wireless device management system, access to a wireless network on the aircraft by the number of wireless devices based on the risk of the threat identified that the wireless device in the number of wireless devices on the aircraft accesses the networked physical weapon during the operation of the aircraft.

2. The method of claim 1 further comprising:

building, by the wireless device management system, the profile for the number of wireless devices on the aircraft.

3. The method of claim 2, wherein the step of building the profile for the number of wireless devices on the aircraft is performed prior to a flight of the aircraft.

4. The method of claim 1 further comprising:

determining whether an action is needed based on the risk; and responsive to a determination that the action is needed, initiating the action by the wireless device management system.

5. The method of claim 1, wherein the step of generating the map for the number of wireless devices on the aircraft is performed using at least one of a passenger seat assignment, a cargo placement, and a detection of a device in an on state on the aircraft.

6. The method of claim 1 further comprising:

responsive to detecting a new wireless device on the aircraft, identifying, by the wireless device management system, a location of the new wireless device on the aircraft; and adding the new wireless device to the map.

7. The method of claim 1 further comprising:

updating, by the wireless device management system, the map during the operation of the aircraft to reflect changes in a location of the wireless device in the number of wireless devices on the aircraft.

8. The method of claim 1 further comprising:

identifying, by the wireless device management system, each wireless device in the number of wireless devices that is in an on state to form a group of switched on wireless devices.

9. The method of claim 8, wherein the step of identifying the each wireless device in the number of wireless devices that is in the on state to form the group of switched on wireless devices comprises:

identifying the risk of the threat that a particular switched on wireless device in the group of switched on wireless devices on the aircraft accesses the networked physical weapon, forming an identification;

wherein the identification uses the state information for the aircraft and the profile; and further comprising:

initiating an action based on the risk of the threat identified that the particular switched on wireless device in the group of switched on wireless devices on the aircraft accesses the networked physical weapon.

10. The method of claim 9, wherein the action comprises at least one of taking no action, preventing communications by the group of switched on wireless devices, preventing a selected type of communications by the group of switched on wireless devices, and preventing communications of the particular switched on device in the group of switched on devices based on a location of the particular switched on device on the aircraft.

11. A method for managing communications by wireless devices, the method comprising:

building, by a wireless device management system, a profile for a number of wireless devices on a platform, wherein the wireless device management system comprises one or more of hardware and non-transitory software;

generating, by the wireless device management system, a map of the number of wireless devices on the platform, wherein the map comprises graphical indicators; and identifying, by the wireless device management system, a risk of a threat that a wireless device in the number of wireless devices on the platform accesses a networked physical weapon; and wherein the identifying uses state information for the platform and the profile.

12. The method of claim 11 further comprising:

managing, by the wireless device management system, access to a wireless network on the platform by the wireless devices in the number of wireless devices based on the risk of the threat identified that the wireless device in the number of wireless devices accesses the networked physical weapon.

13. The method of claim 12, wherein the step of managing the access to the wireless network on the platform comprises:

identifying, by the wireless device management system, each wireless device in the number of wireless devices that is in an on state to form a group of switched on wireless devices;

identifying, by the wireless device management system, the risk of the threat that a particular switched on wireless device in the group of switched on wireless devices on the platform accesses the networked physical weapon, forming an identification, wherein the identification uses the state information for the platform and the profile; and initiating, by the wireless device management system, an action based on the risk of the threat identified that the particular switched on wireless device in the group of switched on wireless devices on the platform accesses the networked physical weapon.

14. An apparatus comprising:

a wireless device management system comprising one or more of hardware and non-transitory software configured to:

generate a map for a number of wireless devices on an aircraft in which the number of wireless devices is identified in a profile, wherein the map comprises graphical indicators, wherein the profile comprises a number of entries, and wherein each entry in the number of entries comprises device properties for a wireless device in the number of wireless devices on the aircraft and a passenger identifier;

identify a risk for the number of wireless devices on the aircraft during operation of the aircraft using state information for the aircraft and the profile; and manage access to a wireless network on the aircraft by the number of wireless devices based on the risk identified for the number of wireless devices.

15. The apparatus of claim 14, wherein the wireless device management system is further configured to build the profile for the number of wireless devices on the aircraft.

16. The apparatus of claim 14, wherein the wireless device management system builds the profile for the number of wireless devices on the aircraft prior to a flight of the aircraft.

17. The apparatus of claim 14, wherein the wireless device management system is configured to identify each wireless device in the number of wireless devices that is in an on state to form a group of switched on wireless devices; identify the risk for the group of switched on wireless devices on the aircraft using the state information for the aircraft and the profile; and initiate an action based on the risk identified for the group of switched on wireless devices.

18. The apparatus of claim 17, wherein the action comprises at least one of taking no action, preventing communications by the group of switched on wireless devices, preventing a selected type of communications by the group of switched on wireless devices, preventing communications of a particular switched on device in the group of switched on devices based on a location of the particular switched on device on the aircraft.

19. The method of claim 12, wherein:
the profile comprises a number of entries;
each entry in the number of entries comprises device properties for the wireless device in the number of wireless devices on the platform and a passenger identifier; and
the graphical indicators are on a representation of an interior of the platform indicating locations of the number of wireless devices on the platform.

20. The apparatus of claim 14, wherein:
the risk for the number of wireless devices on the aircraft comprises a risk of a threat that the wireless device in the number of wireless devices accesses a networked physical weapon on the aircraft; and
the graphical indicators are on a representation of an interior of the aircraft indicating locations of the number of wireless devices on the aircraft.

* * * * *